United States Patent [19]

Aiudi

[11] 3,834,086

[45] Sept. 10, 1974

[54] FORM TOOL FIXTURE

[76] Inventor: Rugero W. Aiudi, 32 George St., St. Bristol, Conn. 06010

[22] Filed: Jan. 8, 1973

[21] Appl. No.: 322,015

[52] U.S. Cl. .............................. 51/218 A, 51/220
[51] Int. Cl. ............................................. B24b 3/00
[58] Field of Search...... 51/218 A, 218 R, 220, 225, 51/277

[56] References Cited
UNITED STATES PATENTS

| | | | |
|---|---|---|---|
| 2,379,594 | 7/1945 | Ringgelli | 51/225 |
| 2,443,325 | 6/1948 | Post | 51/277 X |
| 2,446,128 | 7/1948 | Daddona | 51/218 A |
| 2,912,801 | 11/1959 | Sherman | 51/220 |
| 3,069,818 | 12/1962 | Atols | 51/277 X |

OTHER PUBLICATIONS

"Fixture Checks Form Tool Grind," Amer. Machinist, Sept. 9, 1948, p. 128.

Primary Examiner—Harold D. Whitehead

[57] ABSTRACT

A form tool fixture to hold a cylindrical cutting form tool in order to grind its cutting edge consists of a body member, a screw threaded member protruding from a front face of the body member upon which the form tool is mounted, a wing nut to hold the form tool and a swingably mounted stop member positioned to correctly align the form tool and then to swing out of the way of the grinding head. The fixture also has flat side surfaces formed at angles to grind front clearance angles on the form tool.

4 Claims, 7 Drawing Figures

FORM TOOL FIXTURE

BACKGROUND OF THE INVENTION

The present invention relates to fixtures for holding cutting tools during the sharpening of such tools and more particularly to a fixture to hold a cylindrical form tool for grinding.

A cylindrical cutting form tool, which may be disklike in shape or thicker, is used on a milling machine to form a groove or other opening having the cross-sectional contour of the cutting edge of the form. Such form tools may also be used as the fixed tool in a lath to form a groove or edge on a rotating work piece.

In general, the form tool consists of a round cylinder which is cut away along a radius, or parallel to a radius, to form a cutting edge. The cylinder, in cross-section, has a number of shoulders and at least one protrusion.

It has been suggested that the cutting face of such form tools may be ground, to sharpen the cutting edge, by using a fixture having a gauge. However, such a fixture may be relatively expensive to produce and complicated to use. Such form tools have also been ground by holding them by hand or in a hand-held clamp; however, such methods are not dependable as they rely upon the skill and attention of the machinist.

OBJECTS OF THE INVENTION

It is the objective of the present invention to provide a fixture for the re-sharpening of cylindrical forms in which: (1) the form may be readily mounted upon and removed from the fixture; (2) the fixture is relatively simple so that it may be produced at a relatively low cost and not complicated to operate; and (3) the fixture will provide an accurate and repetitive positioning of the form relative to the grinding wheel without the exercise of special skill by the machine operator.

SUMMARY OF THE INVENTION

It has been found that the foregoing and related objects can be readily attained in a form tool fixture for supporting a form tool in position for grinding a cutting face on a form tool in a plane spaced from and parallel to a plane through the axis of the form tool. In addition, the fixture has side surfaces adapted so that clearance angles can be readily ground on the front of the form tool The fixture includes a support block with a flat front face for receiving a form tool and a shaft protruding from the front face for positioning in an aperture of the form tool. Releasable fastening means are provided for the shaft in order to secure the form tool against the front face of the fixture. The support block has a cutout portion for exposing the cutting face of the form tool to the grinding wheel.

Advantageously, the fixture has a stop member mounted on the support block by pivot means rotatably mounting the stop member on the support block. The stop member has a free end with a stop surface movable adjacent to the front face of the block to engage the cutting face of the form tool in order to conveniently set the form tool in position for grinding a cutting face in a plane spaced from and parallel to a plane through the axis of the form tool. The stop surface on the free end of the stop member extends a predetermined distance below a horizontal plane extending through the center of the form tool mounted on the support block. The stop member desirably has an elongated horizontal arm extending over the top of the support block and a downwardly extended leg portion with the stop surface formed on the underside thereof.

In addition, the support block has a plurality of flat surfaces for supporting the block on the surface of a grinder in order to form front clearance angles on the form tool, the side surfaces being formed at angles of less than 90° to the plane of the front face of the block. The flat side surfaces may be two surfaces formed on one side of the block extended at angles of 15° or 23° from a plane perpendicular to the front face.

BRIEF DESCRIPTION OF THE DRAWINGS

Other objects and advantages will be apparent from the detailed specification, claims and drawings wherein:

DETAILED DESCRIPTION OF THE PREFERRED EMBODIMENT

Figure 1:
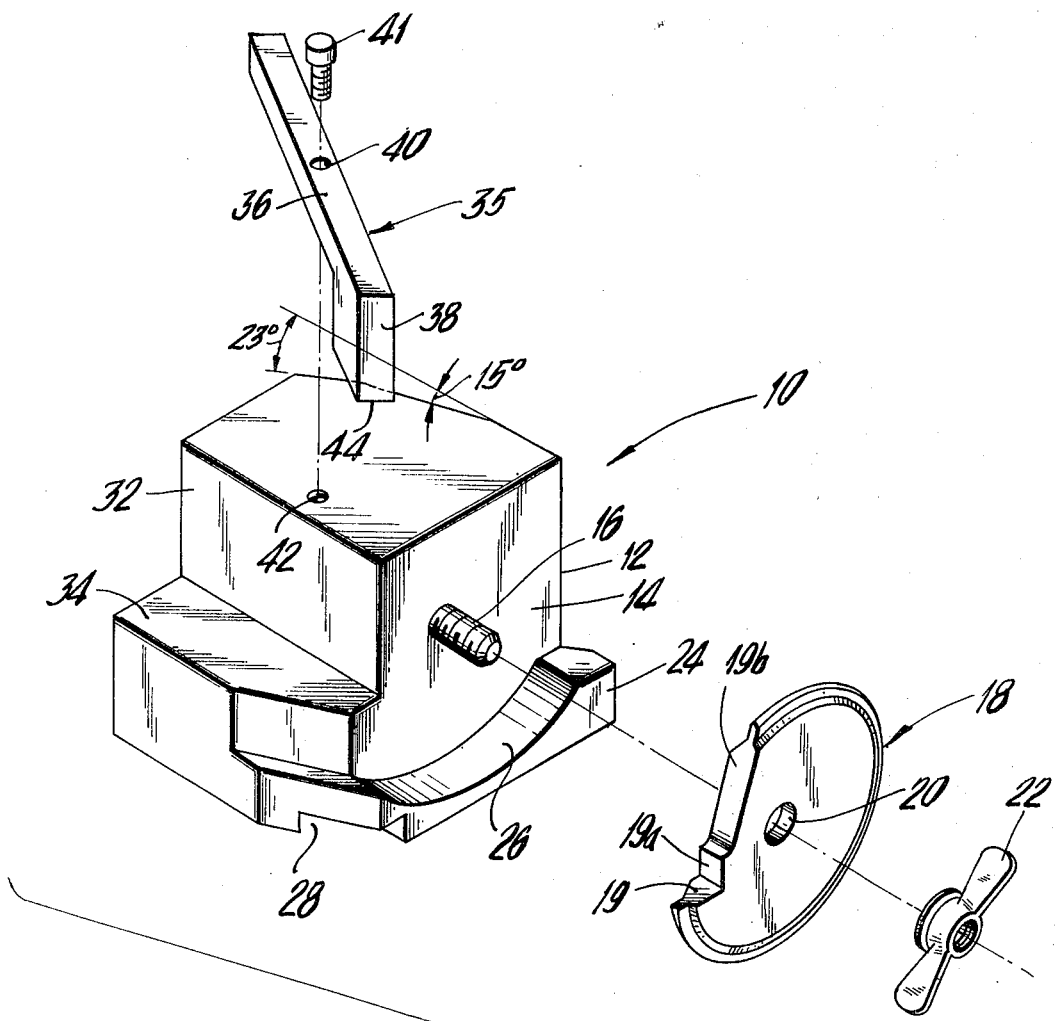
FIG. 1 is an exploded perspective view of the form tool fixture of the present invention and a form tool.

As illustrated in FIG. 1, the form tool fixture generally designated by the reference numeral 10, includes a solid metal support block 12 having a flat front face 14 with a protruding threaded member 16 centrally attached thereto for receiving a form tool 18. As illustrated in FIG. 1, the form tool 18 with the usual central aperture 20 can readily be mounted on the fixture 10 against the flat front face 14 with the threaded member 16 disposed in the aperture 20 and the form tool 18 held firmly in place by the wing nut 22. A flange 24 having a curved ledge 26 extends outwardly from the front face 14 of the support block 12 under the threaded member 16.

In order to fit the fixture 10 in position on a surface grinder, bottom guide groove 28 is formed on the underside of the support block 12 to fit on a slide rib of a surface grinding machine. To provide for clearance space for passage of a grinding wheel 30 of a surface grinder the support block 12 has an L-shaped cut out portion formed by side wall 32 and shoulder 34.

The form tool 18 is generally disk-like and has a cutting face 19 whose contour or profile corresponds to the contour to be cut parallel to a plane through a radius of the aperture 2. The particular form tool 18 illustrated has a peripheral surface having the desired contour of the groove to be cut in the workpiece and a first and a second cut-back shoulder portions 19a and 19b adjacent the cutting face 19.

For alignment of the form tool 18 on the fixture 10 for proper alignment for grinding by the grinding wheel 30, a stop member, generally designated by the reference numeral 35, is provided having an elongated arm 36 and a downwardly extending leg 38. The arm 36 has an aperture 40 through which bolt 41 is disposed and engaged with a threaded aperture 42 in the block 12 for rotatably mounting the stop 35 relative to the form tool 18.

Figure 3:
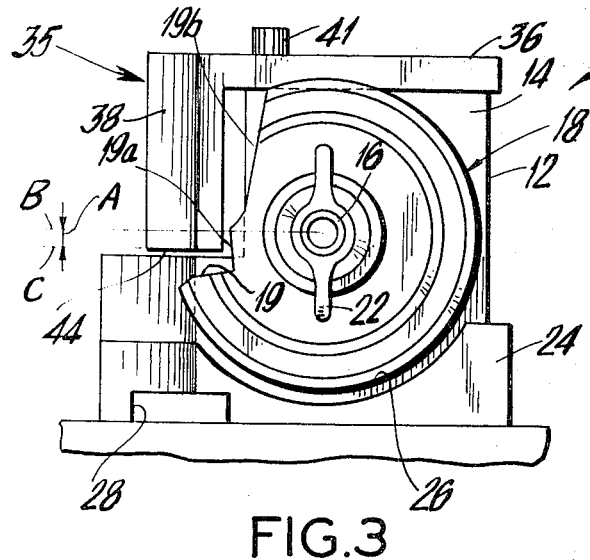
FIG. 3 is a front view of the form tool fixture of FIG. 1 with a form tool mounted thereon.
Figure 4:
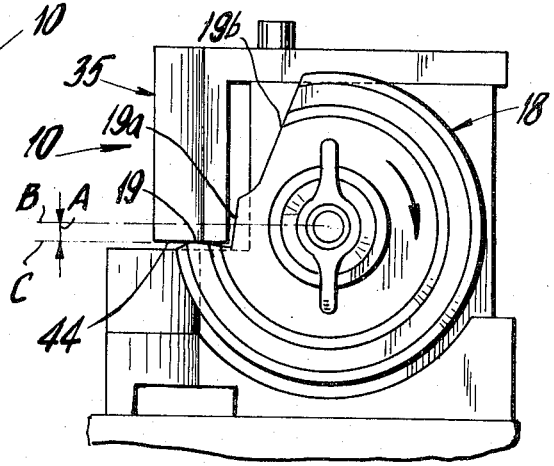
FIG. 4 is a similar view to FIG. 3 but with the form tool rotated against a stop member mounted in the form tool.
Figure 5:
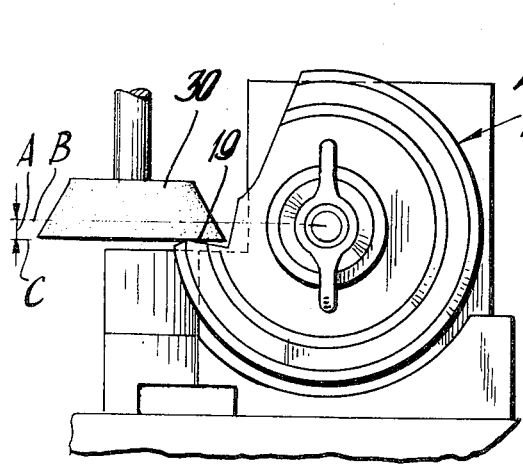
FIG. 5 is a view similar to FIG. 4 but with a grinding wheel of a surface grinder starting to grind the cutting edge of the form tool.
Figure 6:
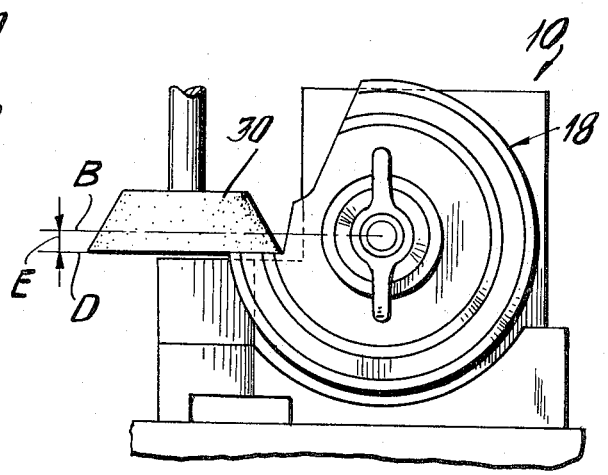
FIG. 6 is a view similar to FIG. 5 but with the grinding wheel completing its grinding of the form tool.

As illustrated in FIG. 3, the underside contact surface 44 of the leg 38 is movable to a position over the cutting face 19 of the form tool 18 so that with the wing nut 22 loosened, the form tool can be rotated, as illustrated in FIG. 4, until the cutting face 19 stops against the contact surface 44 of the leg 38. Thus the form tool fixture has now been conveniently placed in aligned position so that the grinding wheel 30 can properly sharpen the cutting face 19 of the form tool 18. The wing nut 22 is then tightened to securely hold the form tool in the aligned position for proper formation of the cutting face 19, and and stop 35 is then rotated out of the way, and, as shown in FIG. 5, the grinding wheel 30 is lowered to the cutting face 19. The grinding wheel 30, as illustrated in FIG. 6, can thus grind the cutting face 19 at the correct predetermined manner set by the fixture 10 and the stop 35.

Advantageously, in order to set the unsharpened form tool 18 in the proper position for forming the desired rake angle in the cutting face 19, the contact surface 44 extends a preset distance A below a horizontal plane B passing through the center of the form tool 18. The contact surface 44 extends in a plane C parallel to the plane B and spaced therefrom by the distance A. As will be explained hereinafter, different size stop members with legs 38 of varying lengths may be used to set the cutting face 19 in the proper position for setting the desired rake angle.

Figure 2:
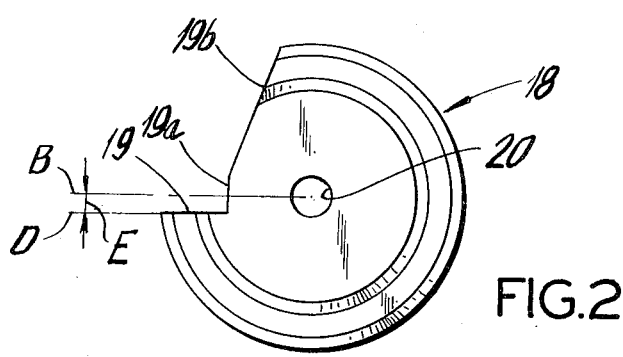
FIG. 2 is a front view of the form tool illustrated in FIG. 1.

As illustrated in FIGS. 4 and 5, the stop 35 sets the upper surface of unsharpened cutting face 19 at a plane C parallel to plane B passing through the axis of the form tool 18. In order to properly sharpen the form tool 18, it is desirable to grind the old cutting face 19 to a plane D parallel to the plane B through the axis of the form tool. As illustrated in FIG. 2, a sharpened cutting tool 18 has the desired cutting face 19 formed in a plane D parallel to the plane B through the axis of the form tool and spaced therefrom by a distance D.

When it is desired to set a zero degree rake angle on the cutting face 19 of the form tool 18, the length of the arm 38 is preformed so that the distance A is set at 0.110 inch below the plane B. The grinding wheel 30, as illustrated in FIG. 5, then grinds 0.015 inch off the cutting face 19 so that the distance E becomes 0.125 inch after grinding is completed as illustrated in FIG. 6.

Advantageously to set the form tool 18 in position for forming different rake angles, a plurality of preformed stop members 35 may be provided having legs 38 of varying lengths to set the cutting face 19 at various distances A from the plane B in order to form the desired rake angle on the cutting face 19 by simply grinding 0.015 inch off the cutting face. For instance, to set a rake angle of 3 degrees another stop member 35 may be used that has a leg 38 of predetermined length extending a distance A of 0.155 inche below the plane B through the center of the form tool 18. In this example, after grinding 0.015 inch off the cutting face 19 the distance E becomes 0.170 inch to form a 3 degree rake angle. Thus, this invention provides for a plurality of preformed stop members 35 having legs of various lengths for use with the support block 12 to form the desired rake angle in order to set the unsharpened cutting face 19 at the desired distance A from a horizontal plane B passing through the center of the form tool 18. Once the desired stop member 35 has been selected and used to set the form tool 18 in position on the support block, all that the user has to do is grind 0.015 inch off the cutting face 19 to have a properly sharpened tool with the desired rake angle.

Figure 7:
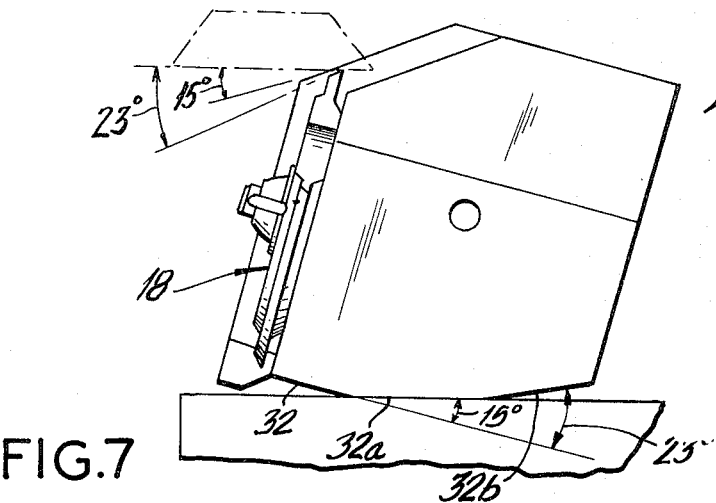
FIG. 7 is a top view of the Fixture of FIG. 1 turned on its side illustrating the positioning of the Fixture against a flat grinder support surface for varying the clearance angle formed by the grinder on the front of the tool.

The grinding clearance angle on the front of the tool depends upon the type of material being machined. For example, a grinding clearance angle of 15° is desirable for ferrous metals and a 23° angle for non-ferrous metals such as brass is desirable. As illustrated in FIGS. 1 and 7, in order to form different cut off angles on the form tool 18 for use on different materials, the support block 12 has a flat side surface 32 extending generally perpendicularly from the front face 14, with flat side surfaces 32a and 32b formed thereon at 15° and 23° angles respectively from the side surface 32. Advantageously, as illustrated in FIG. 7, the flat surfaces 32a and 32b provide for grinding different clearance angles on the front of the form tool 18, i.e., to give a 23° clearance angle on a form tool for use on non-ferrous metals such as brass, or a 15° clearance angle on a form tool for use with ferrous metals such as steel. In order to form the desired clearance angle, the block 12 is turned on its side and either surface 32a or 32b is placed on a flat grinder support surface 33 in order to place the form tool 18 in the desired position for forming the required front clearance angle.

It will be understood that various changes in the details, materials, steps and arrangements of parts, which have been herein described and illustrated in order to explain the nature of the invention, may be made by those skilled in the art within the principle and scope of the invention.

What is claimed is:

1. A form tool fixture for supporting a form tool in position for grinding a cutting face on a form tool in a plane spaced from and parallel to a plane through the axis of the form tool and for grinding clearance angles on the front of form tool including, a support block with a flat front face for receiving a form tool; a shaft protruding from said front face for positioning in an aperture of a form tool, releasable fastening means for said shaft to secure a form tool against said front face, said support block having a cutout portion for exposing the cutting face of the form tool to grinding wheel, a stop member mounted on said support block, means for rotatably mounting said stop member on said block, said stop member having a free end with a stop surface movable adjacent to said front face of said block to engage the cutting face of a form tool to set the form tool in position for grinding a cutting face and wherein said stop surface on the free end of said stop member extends a predetermined distance below and in a plane parallel to a horizontal plane extending through the center of said form tool mounted on said support block.

2. The form tool fixture of claim 1 wherein stop member has an elongated horizontal arm portion extending over the top of said support block, and a downwardly extending leg portion with said stop surface formed on the underside of said leg position.

3. The form tool fixture of claim 2 wherein support block has a plurality of flat side surface for supporting said block on its side to form front clearance angles on a form tool.

4. The form tool fixture of claim 3 wherein said flat side surfaces are two flat surfaces formed on one side of said block extending at angles of 15° and 23° from a plane perpendicular to the plane of said front face.

* * * * *